June 25, 1935.  E. C. HORTON  2,006,323
WINDSHIELD CLEANER
Filed July 31, 1933  2 Sheets-Sheet 1
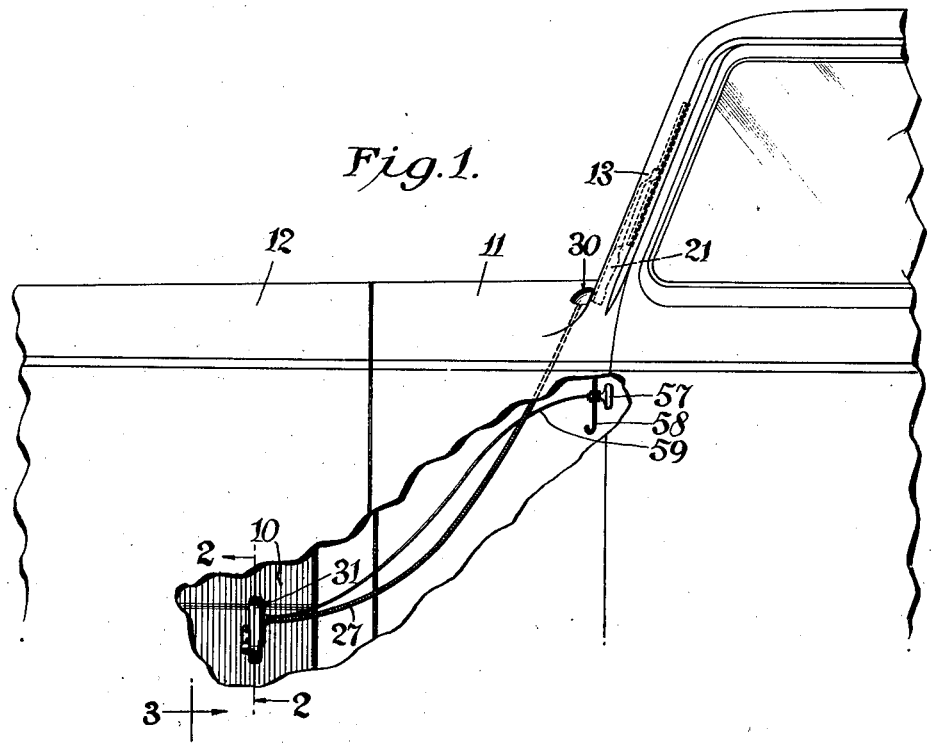
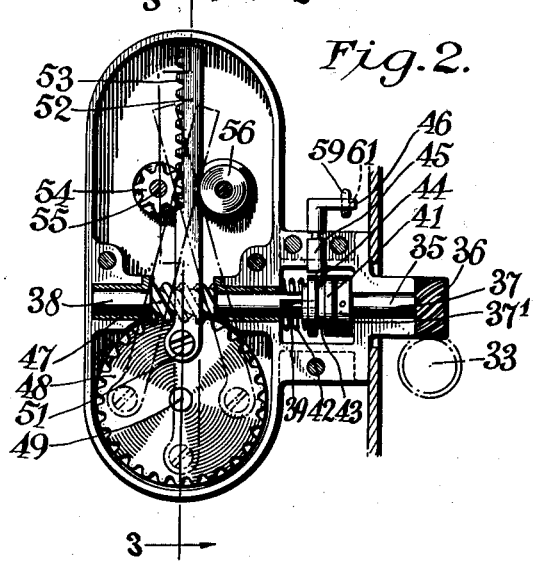
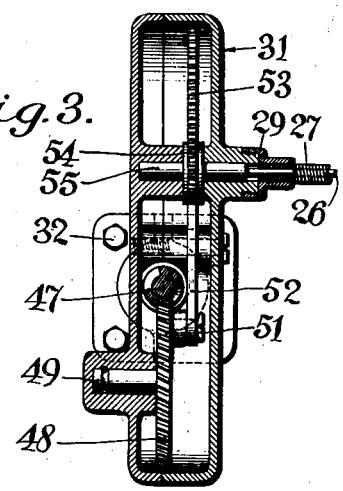
Inventor
Erwin C. Horton,
By Beau & Brooks. Attorneys June 25, 1935.  E. C. HORTON  2,006,323
WINDSHIELD CLEANER
Filed July 31, 1933   2 Sheets-Sheet 2
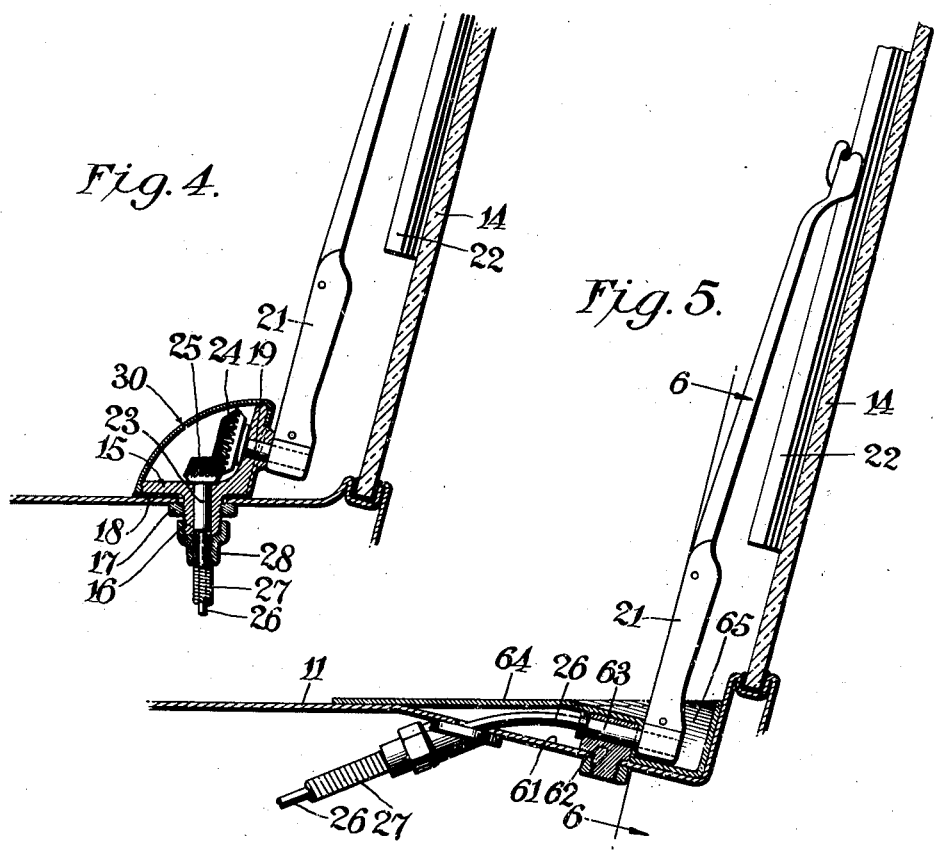
Inventor
Erwin C. Horton
By Beau & Brooks, Attorneys Patented June 25, 1935

2,006,323

UNITED STATES PATENT OFFICE 2,006,323

WINDSHIELD CLEANER

Erwin C. Horton, Hamburg, N. Y., assignor to Trico Products Corporation, Buffalo, N. Y.

Application July 31, 1933, Serial No. 683,100

9 Claims. (Cl. 15—255)

This invention relates to windshield cleaners for motor vehicles, and has particular relation to the actuating mechanisms of such cleaners and to the manner of associating the same with the vehicle constructions upon which they are mounted.

The invention contemplates a wiper arm and blade assembly mounted adjacent the windshield, as for example on the vehicle cowl, for wiping movement over the windshield, and a flexible cable for transmitting angular oscillating movement to the blade and arm. The flexible cable may be driven from the vehicle engine, or other power means adjacent to or mounted upon the engine, through a transmission mechanism for reducing the speed of the drive member and for changing the rotary movement thereof into angular oscillatory movement. By this arrangement the parts of the transmission mechanism, which are connected to the heavy and powerful vehicle power plant and hence need be relatively strong and rigidly supported, may be mounted within a substantial housing located near to, and rigidly secured to or made a part of, the vehicle engine. Transmission mechanism is thus eliminated from the cowl or passenger compartment of the vehicle, and any noises or vibration of the mechanism are isolated in the engine compartment.

These and other objects and advantages of the invention, including those inherent in the formation and arrangement of the component parts, will become apparent from the following description of the typical embodiments of the invention illustrated in the accompanying drawings, wherein:

Fig. 1 is a fragmentary side elevation of a motor vehicle provided with a windshield cleaner in accordance with the instant invention, portions of the vehicle being broken away to show the arrangement of parts;

Fig. 2 is a vertical section taken along lines 2—2 of Fig. 1, through the windshield cleaner drive unit mounted beneath the cowl or hood of the vehicle;

Fig. 3 is a vertical section taken at right angles to the plane of Fig. 2, along line 3—3 of Fig. 2;

Fig. 4 is a vertical sectional view taken longitudinally of the vehicle through a portion of the vehicle cowl and windshield, and the wiper arm mounting portion of the windshield cleaner;

Fig. 5 is a view similar to Fig. 4, but illustrating a modified construction; and Fig. 6 is a sectional view taken along line 6—6 of Fig. 5.

As shown in Fig. 1, the conventional motor vehicle includes an engine 10, a cowl 11 and hood 12 covering the engine, and a frame 13 extending upwardly from the cowl for supporting the windshield glass 14 (appearing in Fig. 4). Mounted on the cowl and adjacent to the windshield glass is a bracket 15 having a portion 16 extending through an opening in the cowl. A clamping member 17 is carried by portion 16 for securing the bracket to the cowl, a gasket 18 being disposed between the latter parts.

A shaft 19, extending substantially normal to the glass 14, is journalled by the bracket 15, and carries on one end an arm 21 that supports the windshield wiper blade 22 for wiping engagement with the glass. A bevel gear 24 fixed to the other end of shaft 19 engages a pinion 25 fixed to shaft 23, the latter being journalled by portion 16 of the bracket and extending through the opening in the cowl. Sheet metal shell 30 is detachably secured over the bracket 15 for housing the gear and pinion and their supporting shafts.

As will be understood, from the foregoing description, if the shaft 23 be angularly oscillated, that is, oscillated about its longitudinal axis, the shaft 19 will be similarly oscillated angularly to effect arcuate reciprocation of the wiper blade 22 over the windshield glass. As the movement of the blade is usually through an arc of between 150° to 180° or thereabout, the shaft 19 should have an equal angular movement. The degree of angular oscillation of the shaft 23 will depend upon the ratio of the pinion 25 to the gear 24, and where this ratio is approximately one to two, as in Fig. 4, the shaft 23 should oscillate through an angle of approximately 360°, that is, reversing after making approximately one revolution in each direction.

The shaft 23 is thus angularly oscillated by a flexible cable 26 connected to it. The cable is housed by a flexible tube 27, one end of the latter being detachably secured to the portion 16 of bracket 15 by a fitting 28, and the other end being connected by a similar detachable fitting 29 to a transmission housing 31 (Figs. 2 and 3) mounted upon the engine 10.

Housing 31 comprises a hollow casing secured by suitable means 32 to the engine 10 in adjacency to a rotating shaft, such as the engine cam shaft or accessory shaft, upon which a gear 33 is mounted. A shaft 35 journalled by the housing 31 carries on its outer end a gear 36 in driven engagement with the engine shaft gear 33, and on its inner end a clutch plate 37 faced with clutch facing material 37'. Axially aligned with shaft 35, and also journalled by housing 31, is a shaft 38. The end of the latter adjacent shaft 35 is splined, as indicated at 39 (Fig. 2), and carries a clutch plate 41 which is movable, longitudinally of the shaft, into and out of frictional engagement with clutch plate 36, a spring 42 being provided to urge the plate 41 into engaged position.

The peripheral face of plate 41 has an annular groove 43 receiving an eccentric projection 44 of a clutch control shaft 45. The latter extends through the housing 31 in substantially normal relation to the axis of shafts 35, 38, and on its outer end carries a crank arm 46 by which the control shaft 45 may be partially rotated to move the clutch plate 41 out of engagement with clutch plate 36.

Shaft 38 carries a worm gear 47 in meshed engagement with a gear wheel 48, the latter being supported by a stub shaft 49 journalled for free rotation in the housing. Pivoted eccentrically at 51 to the gear wheel is a rack 52, having teeth 53 in engagement with a pinion 54. Pinion 54 is fixed to shaft 55 which is journalled in the housing walls and is connected to the flexible cable 26. A guide sheave 56, suitably supported within the housing 31, serves to retain rack 52 engaged with pinion 54.

A push-pull control member 57, shown as mounted on the instrument panel 58 of the vehicle, is attached to one end of a control wire 59, the other end of the wire being pivoted at 61 to the crank arm 46. The illustrated arrangement is such that when the control member is pulled outwardly, the crank arm 46 is partially rotated to release the engaged clutch members 36, 41.

Operation

At all times when the engine 10 is operating, so that gear 33 is rotating, rotary motion will be transmitted to shaft 35 and clutch member 36. However, when control 57 is in its pulled out position and the clutch members are disengaged, the remainder of the apparatus shown will be stationary. When it is desired to set the windshield cleaner into operation, the control 57 is pushed inwardly, allowing the spring 39 to engage the clutch members 41, 36. Thereupon the shafts 35 and 38 will rotate as a unit, the worm 47 rotating the wheel 48 and effecting reciprocation of the rack 52 which imparts angular oscillatory movement to pinion 54, shaft 55, and flexible cable 26. This angular oscillatory movement is transmitted by the cable 26 to the pinion and gear 25, 24, and to the wiper arm, in the manner hereinbefore described, causing the wiper blade 22 to oscillate in an arcuate path over the windshield glass.

It will be understood that by the arrangement described, wherein the flexible cable oscillates angularly, the mechanism for changing the rotary motion of the engine drive member 33 is in the transmission housing 31, located remotely from the windshield wiper and from the passenger compartment of the vehicle. By this arrangement any noises set up by the transmission mechanism are isolated in the engine compartment, and the passenger compartment and cowl structure are relieved of such mechanism. Furthermore, the relatively heavy shafting, which is necessary for mechanism driven from the vehicle engine, is supported by the housing 31 which may be rigidly secured to the engine.

The spring 42 is relatively light in order that should the wiper blade be unduly impeded, as by frozen deposits on the windshield, or by reason of damage to the mechanism, or should the engine operate at an unduly high speed, the clutch members 36, 41 may slip. Thus excessive operating speeds and the imposition of excessive loads upon the wiper mechanism, which might injure the flexible cable 26, or other parts of the mechanism, are obviated.

By varying the ratio of the gear and pinion 24, 25, and similarly varying the ratio of rack 52 and pinion 54, the torque imposed upon the flexible cable, as compared with the torque necessary to oscillate wiper shaft 19, may be varied. In the illustrated embodiment where the ratio of pinion 25 to gear 24 is approximately 1 to 2, the rack 52, on each stroke effects angular movement of the pinion 54 through approximately one complete revolution. Thus the torque imposed upon the flexible cable is about half of that required for oscillating wiper shaft 19, and the cable 26 may accordingly be of comparatively light construction.

The modified construction

Illustrated in Figs. 5 and 6 is a modified arrangement wherein the arm for carrying the wiper blade is connected directly to the flexible cable for movement therewith, without the use of gears such as shown at 24, 25 in Fig. 4. The cowl 11 may have a depression formed therein, as indicated at 61. Secured in the depression in any suitable manner is a bearing block 62, journalling a rock shaft 63. The latter carries the wiper arm 21 with wiper blade 22, and is directly connected to the flexible cable 26 which is angularly oscillated by the mechanism illustrated in Figs. 2 and 3. However, as the flexible cable is oscillated through an angle of only approximately 150°, the stroke of the rack 52 is reduced to slightly less than half of the pitch circumference of pinion 54.

The bearing block 62 has secured thereto, by any suitable means, a sheet metal plate 64. The latter comprises a continuation of the cowl structure for concealing the flexible cable 26 and cable housing 27. A well 65, formed in the plate 64, receives the end of rock shaft 63 and the connected portion of the wiper carrying arm 21. As shown in Fig. 6, the well 65 is preferably of shallow V-cross section, with the shaft 63 near the apex thereof, in order that the arm 21 may have a comparatively wide arc of movement.

It will be understood that the preferred forms of the invention, shown and described herein, are merely illustrative of the inventive principles involved, which may be embodied in other structural forms and arrangements without departing from the scope of the invention.

What is claimed is:

1. In a motor vehicle having an engine compartment with an engine therein having a rotating part, a windshield and supporting structure adjacent thereto, the combination of a wiper mounted on said supporting structure for angular oscillation over said windshield, a flexible cable operatively connected to said wiper for imparting angular oscillatory movement thereto, a casing in the engine compartment mounted upon the engine, transmission means for converting rotary movement into angular oscillatory movement, said means being mounted in said casing and being connected to said rotating part of the engine and to said flexible cable, for converting the rotary motion imparted thereto by said rotating part into angular oscillatory motion and imparting the latter to the flexible cable.

2. In a motor vehicle having an engine compartment having a rotating drive shaft therein, a windshield and supporting structure adjacent the windshield, the combination of a wiper mounted on said supporting structure for angular oscillation over said windshield, a flexible cable operatively connected to said wiper for imparting angular oscillatory motion thereto, a casing in said engine compartment, a first shaft journalled in said casing engaged with and rotated by said rotating drive shaft, a second shaft journalled in said casing for angular oscillatory motion and connected to said flexible cable for imparting angular oscillatory motion thereto, and transmission means in said casing connecting said first and second shafts therein for effecting oscillation of said second shaft by and upon rotation of the first shaft.

3. In a motor vehicle having a power plant with a rotating shaft, a windshield, and supporting structure adjacent to the windshield, the combination of a wiper mounted on said supporting structure for angular oscillation upon the surface of the windshield, an angularly oscillatable flexible cable operatively connected at one end to said wiper for imparting angular oscillatory motion thereto, a casing and parts journalled therein connected respectively to said rotating shaft and to the other end of said flexible cable, and transmission means in said casing for causing rotation of the part connected to said rotating shaft to effect angular oscillation of the part connected to the flexible cable.

4. In a motor vehicle having a windshield, supporting structure extending forwardly from the base of said windshield, and a compartment beneath said supporting structure, the combination of a shaft and bearing means therefor mounted upon said supporting structure, said shaft extending substantially normal to the plane of the windshield, a wiper mounted on the rear end of the shaft for movement over the windshield surface about the axis of the shaft, a flexible cable joined to the forward end of the shaft and extending into said compartment, and means in said compartment for angularly oscillating the flexible cable.

5. In a motor vehicle having a windshield, the combination of a windshield wiper associated therewith and mounted for angular oscillation, a flexible cable operatively connected to said wiper for transmitting angular oscillatory movement thereto, and transmission means for converting a rotary movement into an angularly oscillatory movement for imparting such movement to the said flexible cable.

6. In a motor vehicle having an engine compartment with an engine therein, a windshield and supporting structure therefor, the combination of a windshield wiper associated with the said windshield and mounted for angular oscillation, a flexible cable operatively connected to said wiper for transmitting angular oscillatory movement thereto, and transmission means for converting a rotary movement into an angularly oscillatory movement for imparting such movement to the said flexible cable.

7. In a motor vehicle having a rotating part remote from the windshield thereof, the combination of a windshield wiper mounted for oscillatory movement, an oscillatory flexible shaft connected to the wiper for oscillating the same, and motion converting means operatively connecting the rotating part to said oscillatory flexible shaft for converting the rotary motion of said part into an oscillatory motion to be transmitted as such through the oscillatory flexible shaft to said oscillatory wiper for imparting like motion to the latter.

8. In combination with a motor vehicle having a windshield, supporting structure extending forwardly from the base of the windshield, and a compartment beneath said supporting structure, said supporting structure having a recess extending longitudinally of the vehicle with the bottom of the recess in a plane substantially normal to the plane of the windshield, a shaft and bearing member therefor in said recess, the shaft extending substantially normal to the windshield and the bearing member being secured to said supporting structure, a wiper arm secured to the rear end of the shaft, a flexible cable secured to the forward end of the shaft, said flexible cable extending into said compartment, and a cover plate extending over said recess forwardly of the bearing member for enclosing the portion of flexible cable within the recess.

9. In combination with a motor vehicle having a windshield, supporting structure extending forwardly from the base of the windshield, and a compartment beneath said supporting structure, a substantially L-shaped bracket having a base portion secured on the supporting structure and an upright portion extending upwardly from the rear edge of the base portion, a shaft extending through and journalled in said upright portion and extending substantially normal to the surface of the windshield, a wiper arm secured to the rear end of said shaft, a second shaft extending through said base portion and supporting structure and journalled in said base portion, a flexible cable secured to the lower end of said second shaft and extending into said compartment, means connecting the forward end of the first shaft to the upper end of the second shaft for transmitting angular oscillatory motion therebetween, and a removable cover secured to said bracket and enclosing said means.

ERWIN C. HORTON.